United States Patent [19]

Yamada

[11] Patent Number: 4,858,393
[45] Date of Patent: Aug. 22, 1989

[54] METHOD OF DYNAMICALLY BALANCING CYLINDRICAL ROTORS, AND DEVICE FOR CARRYING OUT THE METHOD

[75] Inventor: Tsutomu Yamada, Nagoya, Japan

[73] Assignee: NGK Insulators, Ltd., Nagoya, Japan

[21] Appl. No.: 155,486

[22] Filed: Feb. 12, 1988

[30] Foreign Application Priority Data

Feb. 24, 1987 [JP] Japan ................................. 62-42349

[51] Int. Cl.[4] ............................................. B24B 41/06
[52] U.S. Cl. .................................. 51/237; 51/289 R; 51/227
[58] Field of Search ................. 51/237 R, 236, 289 R, 51/277, 251, 260, 227

[56] References Cited

U.S. PATENT DOCUMENTS

| | | | |
|---|---|---|---|
| 1,414,190 | 4/1922 | Koehler | 51/237 R |
| 1,600,569 | 9/1926 | Sperry. | |
| 1,671,711 | 5/1928 | Gearing | 51/237 R |
| 1,967,163 | 7/1934 | Thearle. | |
| 2,334,954 | 11/1943 | Pioch et al. | 51/237 R |
| 2,361,142 | 10/1944 | Zimmerman | 51/227 R |
| 3,038,280 | 6/1962 | Dralle | 51/227 R |
| 3,475,969 | 11/1969 | Kincaid. | |

FOREIGN PATENT DOCUMENTS

| | | | |
|---|---|---|---|
| 0032356 | 5/1921 | Norway | 51/168 |
| 2021736 | 12/1979 | United Kingdom. | |

Primary Examiner—Frederick R. Schmidt
Assistant Examiner—Robert A. Rose
Attorney, Agent, or Firm—Arnold, White & Durkee

[57] ABSTRACT

Dynamic balancing of cylindrical rotors composed of ceramic materials is carried out accurately, by means of a device (10) which includes a support shaft (15) to be held by work holders (13, 14) of a grinding machine, and a pair of cylindrical clamp members (20, 21) engageable with the periphery of an axial bore (12) in the sintered rotor body (11) for clamping the rotor body therebetween. The clamp members (20, 21) are axially passed by the support shaft (15) and are provided with adjusting bolts (22a, 22b, 22c) for radial adjustment of the clamp members (20, 21) with respect to the support shaft (15). The rotor body (11) can thus be radially positioned with a desired eccentricity to determine the necessary amount of material to be removed therefrom for correcting the dynamic unbalance.

4 Claims, 1 Drawing Sheet

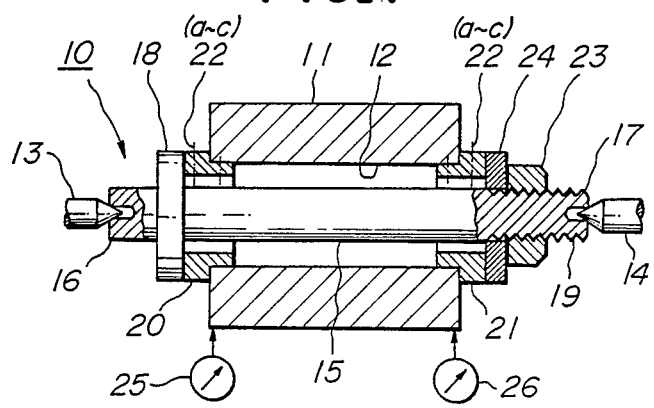
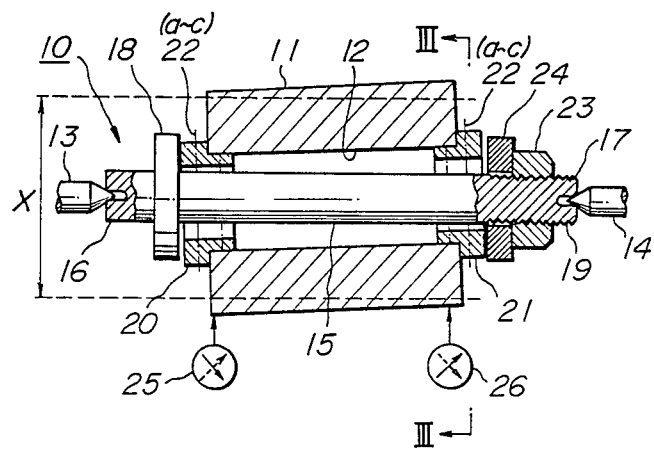
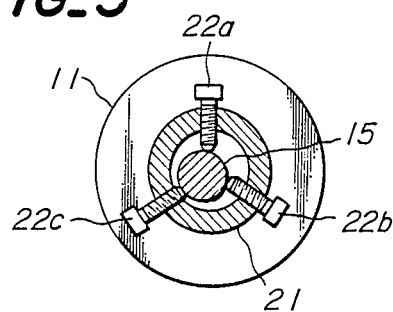

METHOD OF DYNAMICALLY BALANCING CYLINDRICAL ROTORS, AND DEVICE FOR CARRYING OUT THE METHOD

BACKGROUND OF THE INVENTION

1. Field of the Invention

The present invention relates to a method of dynamically balancing cylindrical rotors for pressure wave superchargers and the like, as well as a device which may be used to carry out the method.

2. Description of the Related Art

It is widely known in the art that various kinds of rotors subjected to rotation at a high revolutional speeds encounter a serious problem that even a slight dynamic unbalance induces a significant vibration whereby a smooth operation becomes impossible. Hence, particularly when the rotor comprises a ceramic material, as is the case in superchargers for automobiles and the like, in order to minimize the dynamic unbalance and to thereby dynamically balance the rotor, it has been a conventional practice to carry out a necessary correction of the dynamic unbalance after the shaped body with the desired configuration of the rotor has been subjected to firing, by machining the sintered body and removing therefrom a predetermined quantity of the material, generally with the machining axis which lies on the geometrical center axis of the body.

However, such a conventional machining process does not yield an effective dynamic unbalance correction since, when producing rotors comprising ceramic materials, the sintered body has been subjected to strains during the shaping and/or firing steps, and the geometrical center axis of the sintered body tends to be slightly offset from the predetermined rotational axis of the rotor. Stated otherwise, correction of the dynamic unbalance of the rotor body with reference to the geometrical center axis of the rotor body does not necessarily result in that an accurate dynamic balancing of the rotor has been completed with reference to the rotational axis of the rotor. Needless to say, rotors without a satisfactory dynamic balance cannot be used as a product for practical purposes.

SUMMARY OF THE INVENTION

It is therefore an object of the present invention to mitigate the above-mentioned drawback of the prior art, and to provide positive measures whereby an accurate dynamic balancing can be effected with respect to cylindrical rotors comprising ceramic materials which may accompany strains within a tolerable range.

According to one aspect of the present invention, there is provided a device for correcting dynamic unbalance of a cylindrical rotor comprising a ceramic material with an axially extending center bore, said device being adapted to be used in combination with a grinding machine which includes a pair of work holders for rotatably holding a work to be ground, and also with a rotor body. The device comprises a support shaft with a pair of centering portions on both axial ends thereof and adapted to be rotatably held by said work holders of the grinding machine and a pair of substantially cylindrical clamp members which are adapted to be arranged around the support shaft and supported by said shaft at respective axial locations spaced from each other by a predetermined axial distance corresponding to the axial length of the rotor. The members are engageable with the peripheries of the center bore of the rotor body, and have means for radially adjusting the position of the relevant clamp member with respect to the support shaft.

The present invention also provides a method of correcting dynamic unbalance of a cylindrical rotor comprising a ceramic material with an axially extending center bore, which makes use of the above-mentioned device in combination with a grinding machine including a pair of work holders for rotatably holding a work to be ground. With the method of the present invention, first of all, each clamp member is inserted into the relevant end portion of the center bore of the shaped rotor body, and is engaged with the periphery of the center bore. The support shaft is then passed through the clamp members and hence, through the center bore of the rotor body. The radial position of each clamp member is adjusted with respect to the support shaft, in accordance with a given amount of the dynamic unbalance, and the clamp members are then secured to the shaft, while the shaft is engaged and held by the holders of the grinding machine with the centering portions on both axial ends thereof. Subsequently, the grinding machine is actuated to rotate the rotor body and to effect machining by the grinding tool of the machine and removal of a predetermined amount of material from the outer periphery of the shaped rotor body.

With the above-mentioned method of the present invention, the radial position of each clamp member may be readily adjusted with respect to the support shaft, so that the machining can be carried out without relying on the geometrical center axis of the rotor body and it thus becomes possible to complete an accurate dynamic balancing of the rotor body comprising a ceramic material without the influence of strains to which the rotor body may have been subjected during the production steps.

BRIEF DESCRIPTION OF THE DRAWINGS

FIG. 1 is a longitudinal sectional view of the device for correcting dynamic unbalance of a cylindrical rotor, in accordance with one preferred embodiment of the present invention;

FIG. 2 is a sectional view similar to FIG. 1, and showing the manner of adjusting the radial position of the clamp members with respect to the support shaft; and FIG. 3 is a cross-sectional view taken along the line III—III in FIG. 2.

DETAILED EXPLANATION OF THE PREFERRED EMBODIMENTS

The present invention will now be explained in further detail, by referring to one specific embodiment shown in the drawings.

There is shown, in FIG. 1, one preferred embodiment of the device according to the present invention which is denoted as a whole by reference numeral 10 and which may suitably be used to carry out the dynamic balancing of a sintered rotor body 11. The rotor body 11 comprises a ceramic material, such as silicon nitride, with a cylindrical outer surface and an axially extending center bore 12, which has already been shaped into a predetermined configuration, and subjected to subsequent firing. By way of example only, the rotor body 11 is illustrated herein as being one for a pressure wave supercharger.

The device 10 according to the present invention is intended to be used in combination with a grinding machine, not shown, which includes a pair of work holders 13, 14 forming headstock and tailstock centers, respectively. These holders 13, 14 serve to center and hold a work to be ground by a tool of the machine.

The device 10 in the illustrated embodiment includes a support shaft 15 with a pair of centering portions 16, 17 on both axial ends, which are engageable with the work holders 13, 14 of the machine, respectively. The shaft 15 has a flange 18 adjacent to one centering portion 16, while the outer peripheral surface of the other centering portion 17 is formed with an external thread 19. The device 10 further includes a pair of substantially cylindrical clamp members 20, 21 for the rotor body 11, which are made of appropriate material, such as a carbon steel S45C, and adapted to be loosely arranged about the shaft 15 and supported by the shaft 15 at respective axial locations spaced from each other by a distance determined in accordance with the axial length of the rotor body 11.

The clamp members 20, 21 are engageable with the inner peripheries on both axial ends of the center bore 12 of the rotor body 11, in order to hold the rotor body 11 during the machining. The clamp members 20, 21 are provided with three adjusting bolts 22a, 22b, 22c, respectively, which serve to adjust the radial position of each clamp member 20, 21. These bolts 22a, 22b, 22c extend radially, and are spaced from each other circumferentially of the respective clamp members 20, 21 with an equiangular relationship.

In the operation position of the device 10 shown in FIG. 1, the support shaft 15 is held by, and between, the work holders 13, 14 of the grinding machine engaging the centering portions 16, 17 of the shaft 15, respectively. The flange 18 is in abutting engagement with one axial end of the clamp member 20 while the other axial end of the clamp member 20 is in engagement with the inner periphery on one side of the center bore 12 in the rotor body 11. Similarly, one axial end of the clamp member 21 is in engagement with the inner periphery on the other side of the center bore 12 in the rotor body 11, while the other axial end of the clamp member 21 is axially urged by a nut 23 with a spacer ring 24 therebetween. The spacer ring 24 is formed of an appropriate material, such as a carbon steel S45C. Dial gauges 25, 26 are arranged with their pickup spindles in contact with the outer peripheral surface of the rotor body 11, to ascertain whether or not adjustment of the bolts 22a, 22b, 22c resulted in a proper positioning of the clamp members 20, 21 with the desired eccentricity with respect to the support shaft 15. When the clamp members 20, 21 are in their respectively adjusted positions to place the rotor body 11 with a desired eccentricity with respect to the support shaft 15, machining is effected to the rotor body 11 to remove the predetermined quantity of the material and thereby dynamically balance the rotor body 11.

The method according to the present invention for dynamically balancing the rotor body 11, by using the device 10 shown in FIG. 1, includes steps which will be explained hereinafter.

The first step is to carry out an accurate measurement of the dynamic unbalance of the rotor body 11 and, to this end, the outer surface and end surfaces of the rotor body 11 are subjected to a preliminary machining by the grinding machine. The angle and amount of the dynamic unbalance of the rotor body are measured by a known dynamic balancing machine, not shown, and the necessary eccentricity of the rotor body 11 with respect to the support shaft 15 is calculated based on the measured dynamic unbalance amount.

The second step is to mount the rotor body 11 on the grinding machine. More particularly, as shown in FIG. 1, the clamp members 20, 21 are inserted into the center bore 12 in the rotor body 11 and connected with each other into an integral sub-assembly by an appropriate means, not shown. The support shaft 15 is passed through the sub-assembly until the flange (18) comes into abutment with the end surface of the clamp member 20 which is remote from the rotor body 11. Subsequently, with an adequate torque, the nut 23 is treadedly connected with the external thread 19 of the support shaft 15, with the spacer ring 24 interposed between the nut 23 and the clamp member 21. It should to be noted at this stage that an excessively tight connection of the nut 23 should be avoided.

The sub-assembly including the rotor body 11, support shaft 15, and clamp members 20, 21 is then mounted on the grinding machine by engaging the work holders 13, 14 of the machine with the centering portions 16, 17 on both axial ends of the support shaft 15.

The third step is to measure the eccentricity or deviation at both ends of the rotor body 11 by using the dial gauges 25, 26 which are mounted on the machine bed such that their pickup spindles are brought into contact with the outer peripheral surface of the rotor body 11. As shown in FIG. 2, the rotor body 11 is slowly rotated and, while observing the indices of the dial gauges 25 26, the adjusting bolts 22a, 22b, 22c of the clamp members 20, 21 are adjusted until the desired eccentricity of each clamp member with respect to the support shaft 15 is achieved. Tee measurement of the eccentricity can be effected by other suitable means also, including a laser measuring device. When this adjustment has been completed, the nut 23 is fully tightened such that the assembly of the rotor body 11, clamp members 20, 21 and support shaft 15 forms an integrated rigid body.

The last step is to effect machining of the rotor body 11 by grinding the outer peripheral surface of the rotor body 11 and removing therefrom the material corresponding to the adjusted amount of the eccentricity, until the outer peripheral surface of the rotor body has the finished diameter X and is completely coaxial with the predetermined rotational axis of the rotor.

The following Table shows the results of dynamic balancing test carried out to confirm the advantage of the present invention.

TABLE

| Sample Number | Pre-Unbalance Correction | | | | Post-Unbalance Correction | | | |
|---|---|---|---|---|---|---|---|---|
| | Left | | Right | | Left | | Right | |
| | Angle [°] | Amount [g · cm] | Angle [°] | Amount [g · cm] | Angle [°] | Amount [g · cm] | Angle [°] | Amount [g · cm] |
| 1 | 295 | 22.0 | 295 | 22.5 | 300 | 7.0 | 300 | 6.0 |
| 2 | 285 | 18.5 | 275 | 22.5 | 270 | 5.5 | 260 | 4.0 |

TABLE-continued

| | Pre-Unbalance Correction | | | | Post-Unbalance Correction | | | |
|---|---|---|---|---|---|---|---|---|
| | Left | | Right | | Left | | Right | |
| Sample Number | Angle [°] | Amount [g · cm] | Angle [°] | Amount [g · cm] | Angle [°] | Amount [g · cm] | Angle [°] | Amount [g · cm] |
| 3 | 270 | 13.0 | 270 | 10.0 | 260 | 2.5 | 110 | 0.5 |

In this Table, the angle [°] is defined with respect to one arbitrary reference point (0°) on the outer periphery of the rotor body, and is measured clockwisely. The amount of unbalance [g.cm] is obtained by multiplying the unbalance weight [g] measured by the balancing machine, by the radius [cm] of the rotor. In case of the sample 1 in the Table, for example, the test data reveals that, before completing the dynamic balancing, the rotor body is dynamically unbalanced by the weight of 22.0 g, and in the direction of 295°; hence, the eccentricity for carrying out the machining has been determined such that the 295° point on the outer periphery of the rotor body projects radially outwardly as compared with the remaining points. As is apparent from the Table, the dynamic balancing method according to the present invention makes it possible to significantly lower the undesirable dynamic unbalance of the rotor body by one third to one eighth.

It will be readily appreciated that the present invention makes use of a pair of clamp members which are engageable with the rotor body comprising a ceramic material, and whose radial positions with respect to the support shaft can be readily adjusted corresponding to the desired eccentricity of the rotor body. Consequently, an accurate dynamic balancing of the rotor body can be readily and positively carried out, without relying on the geometrical center axis of the shaped rotor body, permitting a practical use of dynamically well-balanced rotors of ceramic materials.

While the present invention has been described with reference to specific examples, various variations or modifications may be made without departing from the scope of the invention. For example, at least one of the centering portions on both axial ends of the support shaft, which have been shown as including centering recesses engageable with the headstock and tailstock centers of the grinding machine, may comprise end portion of the support shaft adapted to be engaged by a work holder of the machine formed of a chuck.

What is claimed is:

1. A device for correcting dynamic unbalance of a cylindrical rotor comprising a ceramic material with an axially extending center bore defined by inner peripheries of said cylindrical rotor, said device being adapted to be used in combination with a grinding machine which includes a pair of work holders for rotatably holding a workpiece to be ground, and also with a sintered rotor body, said device comprising:

a support shaft with a pair of centering portions arranged on both axial ends thereof and adapted to be rotatably held by said work holders of the grinding machine; and a pair of substantially cylindrical clamp members adapted to be arranged around the support shaft and supported by said shaft at respective axial locations spaced from each other by a predetermined axial distance corresponding to an axial length of the rotor body, said clamp members being engageable with said inner peripheries of the center bore of the rotor body, and having means for radially adjusting the position of each clamp member with respect to the support shaft, said means for radially adjusting the position of each clamp member comprising at least three adjusting bolts extending radially through each clamp member in an equiangularly spaced manner.

2. A device according to claim 1 wherein at least one of said centering portions of the support shaft is engageable with said work holder formed of a headstock or tailstock center of the grinding machine.

3. A device according to claim 1 wherein at least one of said centering portions of the support shaft is engageable with said work holder formed of a chuck of the grinding machine.

4. A method of correcting dynamic unbalance of a cylindrical rotor body comprising a ceramic material with an axially extending centerbore defined by inner peripheries of said cylindrical rotor, comprising the steps of:

inserting a clamp member into each end portion of the center bore of said rotor body, and engaging the clamp members with said inner peripheries of the center bore;

axially passing a support shaft through the clamp members;

radially adjusting a position of each clamp member with respect to the support shaft, in accordance with a given amount of dynamic unbalance of said rotor, said radially adjusting step being performed by manipulating at least three adjusting bolts extending radially through each clamp member in an equiangularly spaced manner;

securing the clamp members to said support shaft while holding said shaft, a pair of work holders of a grinding machine, in engagement with centering portions of both axial ends of the support shaft; and actuating the grinding machine to rotate the rotor body and effect machining of the rotor by a grinding tool of the grinding machine and removal of a predetermined amount of material from an outer periphery of the rotor body.

* * * * *